US012485753B2

(12) United States Patent
Chang et al.

(10) Patent No.: US 12,485,753 B2
(45) Date of Patent: Dec. 2, 2025

(54) DISPLAYING DEVICE AND ROTATING ASSEMBLY

(71) Applicants: Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Chi-Cheng Wen, New Taipei (TW); Chih-Cheng Lee, New Taipei (TW); Wen-Bin Huang, New Taipei (TW); Tsung-Hsin Wu, New Taipei (TW); Yu-Chih Cheng, New Taipei (TW); Hsiu-Fu Li, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 602 days.

(21) Appl. No.: 17/901,092

(22) Filed: Sep. 1, 2022

(65) Prior Publication Data

US 2023/0322078 A1    Oct. 12, 2023

(30) Foreign Application Priority Data

Apr. 12, 2022    (CN) .......................... 202220840040.7

(51) Int. Cl.
*B60K 35/22*    (2024.01)
*B60K 35/53*    (2024.01)

(52) U.S. Cl.
CPC .............. *B60K 35/22* (2024.01); *B60K 35/53* (2024.01); *B60K 2360/816* (2024.01)

(58) Field of Classification Search
CPC ........ B60K 35/00; B60K 35/22; B60K 35/50; B60K 35/53; B60K 2360/816;
(Continued)

(56) References Cited

U.S. PATENT DOCUMENTS

| 2007/0200931 A1* | 8/2007 | Hwang | F16M 11/105 |
| | | | 348/184 |
| 2011/0075335 A1 | 3/2011 | Nagami | |

(Continued)

FOREIGN PATENT DOCUMENTS

| CN | 110154923 A | * 8/2019 | ......... B60R 11/0229 |
| EP | 3750752 A | 12/2020 | |

*Primary Examiner* — Allen L Parker
*Assistant Examiner* — Keon Kim
(74) *Attorney, Agent, or Firm* — ScienBiziP, P.C.

(57) ABSTRACT

A rotating assembly for a displaying device allowing vertical and horizontal presentation as a user requires. A displaying assembly, a transmitting assembly, and a driving assembly are included in the displaying device. The displaying assembly includes a displaying panel and a first clamping structure, the first clamping structure includes fixing structures with tenon structures in between. The transmitting assembly includes a second clamping structure and a connecting structure, the clamping structure comprises a clamping joint, the clamping joint is coupled to the tenon structure, and fixing grooves are defined on the second clamping structure. The fixing grooves are matched with the fixing structures, an end of the connecting structure is fixedly connected to the second clamping structure. The driving assembly includes a rotating driving member, an output shaft of the driving member is connected to the connecting structure.

19 Claims, 4 Drawing Sheets

(58) Field of Classification Search
CPC .......... B60K 2360/834; B60K 2360/84; G06F 2200/1612; G06F 2200/1614; G06F 1/1601; B60R 2011/0085
See application file for complete search history.

(56) References Cited

U.S. PATENT DOCUMENTS

| | | |
|---|---|---|
| 2017/0174146 A1 | 6/2017 | Kipp |
| 2021/0016720 A1* | 1/2021 | Bai .......................... F16H 57/02 |
| 2022/0003355 A1 | 1/2022 | Hsu |

* cited by examiner

DISPLAYING DEVICE AND ROTATING ASSEMBLY

FIELD

The subject matter herein relates to technical field of automobile control, especially relates to a displaying device and a rotating assembly.

BACKGROUND

With the continuous improvement of the entertainment and intelligent functions of modern cars, on-board multimedia equipment is becoming more and more popular. Customers need more flexibility in the vehicle mounted central control panel. Most of existing central control panels are directly fixed to beam of instrument panel in form of a horizontal screen or a vertical screen and the orientation cannot be changed.

The fixed horizontal screen or vertical screen cannot meet the user's need to rotate the screen arbitrarily. A user needs the vehicle central control screen to be able to switch between the horizontal screen and vertical screen.

SUMMARY

The present disclosure provides a displaying device and a rotating assembly, to solve the problem of switching the horizontal screen or vertical screen flexibly.

The displaying device includes a displaying assembly and a transmitting assembly connected to the displaying assembly. The displaying assembly includes a displaying panel and a first clamping structure connected to the displaying panel. The first clamping structure includes tenon structures and fixing structures, the tenon structures are positioned between the fixing structures. The transmitting assembly includes a second clamping structure and a connecting structure, the second clamping structure is coupled to the first clamping structure, the clamping structure comprises a clamping joint, the clamping joint is coupled to the tenon structure, fixing grooves are defined on the second clamping structure, number and profile of the fixing grooves are matched with the fixing structures, and an end of the connecting structure is fixedly connected to the second clamping structure.

The rotating assembly includes a first clamping structure for connecting a displaying panel, a transmitting assembly, and a driving assembly. The first clamping structure includes tenon structures and fixing structures, the tenon structures are positioned between the fixing structures. The transmitting assembly includes a second clamping structure and a connecting structure, the second clamping structure is coupled to the first clamping structure, the clamping structure comprises a clamping joint, the clamping joint is coupled to the tenon structure, and fixing grooves are defined on the second clamping structure. Number and profile of the fixing grooves are matched with the fixing structures, an end of the connecting structure is fixedly connected to the second clamping structure. The driving assembly includes a driving member, an output shaft of the driving member is connected to the connecting structure.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DESCRIPTION OF MAIN COMPONENTS OR ELEMENTS

Figure 1:
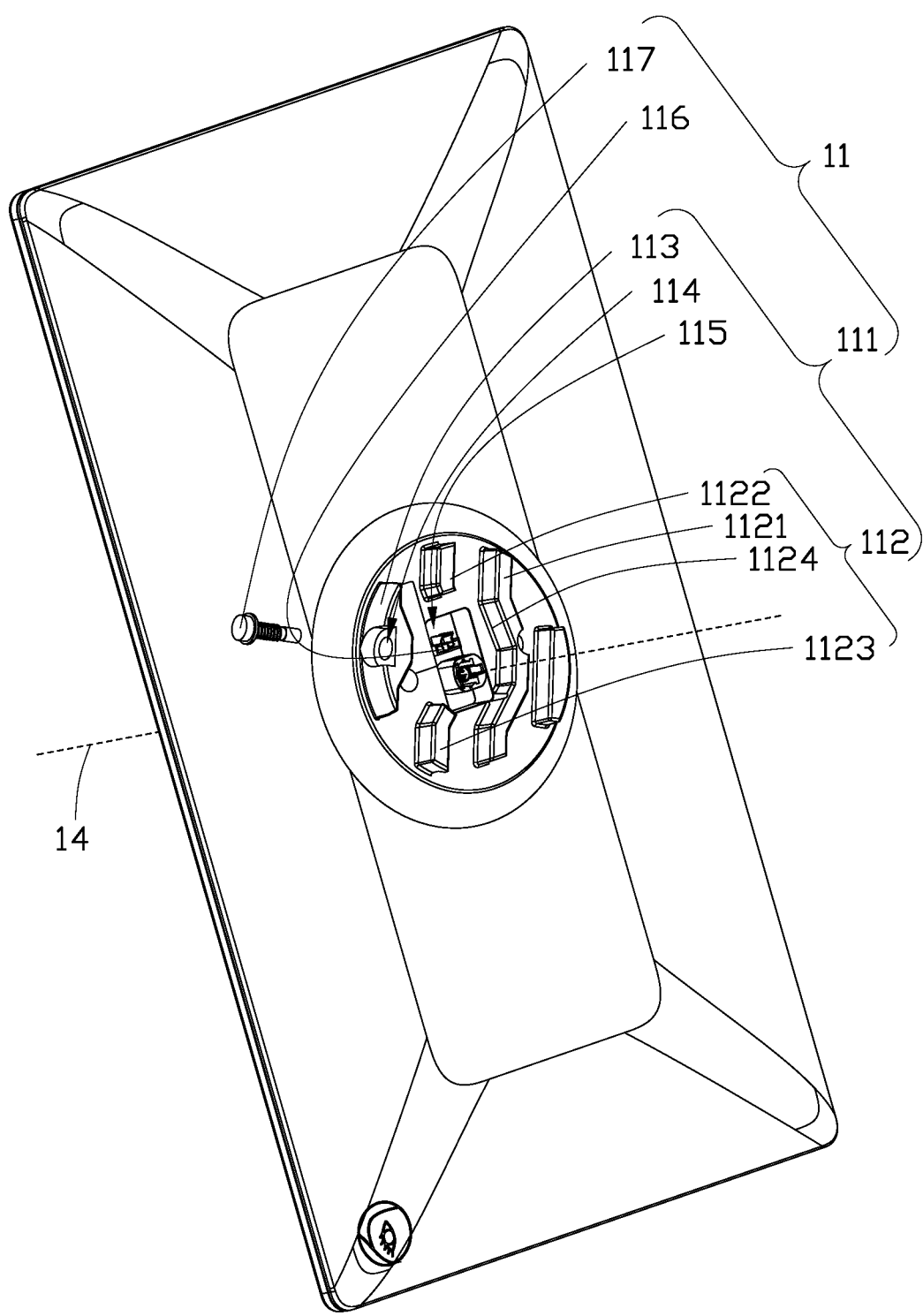
FIG. 1 is a schematic view of a displaying assembly of a displaying device in an embodiment of the present application.

Displaying device 1;
Displaying assembly 11;
First clamping structure 111;
Tenon structures 112;
First tenon 1121;
Second tenon 1122;
Third tenon 1123;
Bending part 1124;
Fixing structure 113;
First connecting hole 114;
Receiving hole 115;
First signal interface 116;
Connecting member 117;
Transmitting assembly 12;
Second clamping structure 121;
Connecting structure 122;
Clamping joint 123;
Fixing groove 124;
Second connecting hole 125;
Through hole 126;
Side wall 127;
Second signal interface 128;
Bearing 129;
Driving assembly 13;
Driving member 131;
Housing 132;
Opening 133;
Cavity 134;
Rotating axis 14.

DETAILED DESCRIPTION

In order to make the above-mentioned objects, features, and advantages of the present disclosure more obvious, a description of specific embodiments of the present disclosure will be described with reference to the accompanying drawings. The present disclosure can be implemented in many ways different from those described herein, and those skilled in the art can make similar improvements without violating the contents of the present disclosure. Therefore, the present disclosure is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present disclosure herein are only for describing specific embodiments, and are not intended to limit the present disclosure.

Figure 2:
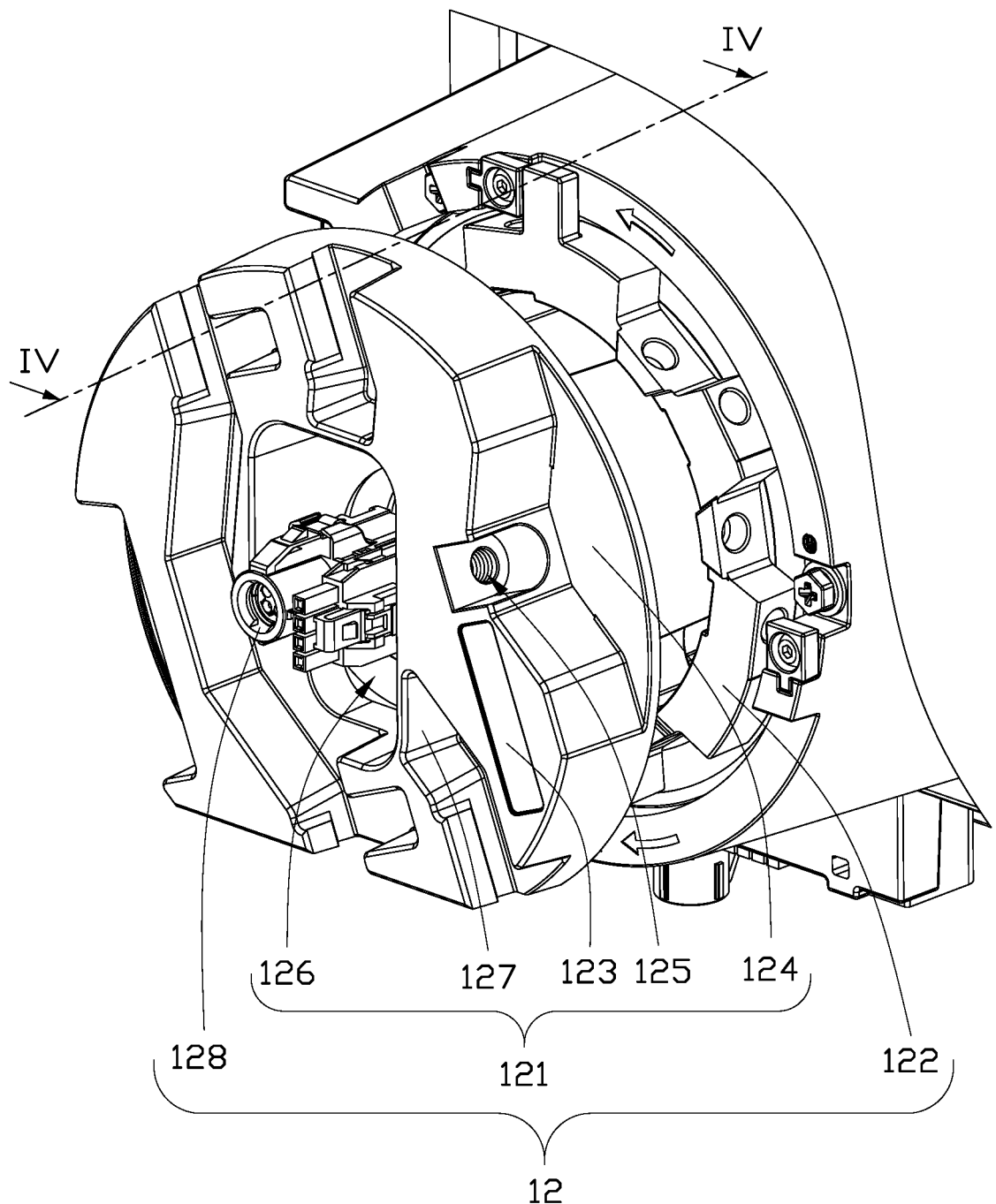
FIG. 2 is a schematic view of a transmission assembly of the displaying device in an embodiment of the present application.

Referring to FIG. 1 and FIG. 2, a displaying device 1 as shown can rotate around a rotating axis 14 automatically, and the displaying device 1 includes a displaying assembly 11 and a transmission assembly 12. FIG. 1 is a schematic view of the displaying assembly 11 of a displaying device 1. FIG. 2 is a schematic view of the transmission assembly 12 of the display device 1. The displaying assembly 11 is coupled to the transmission assembly 12.

The displaying assembly 11 includes a displaying panel and a first clamping structure 111 connected to the displaying panel. The first clamping structure 111 includes tenon structures 112 and fixing structures 113. An extending direction of the tenon structures 112 and the fixing structures 113 is parallel to the rotating axis 14. The tenon structures 112 are positioned between the fixing structures 113. There are two fixing structures 113. In other embodiment, quantity of the fixing structures 113 may be one, or more than two. The transmission assembly 12 includes a second clamping structure 121 and a connecting structure 122. The second clamping structure 121 is detachably coupled to the first clamping structure 111. The second clamping structure 121 includes clamping joints 123. The clamping joints 123 and the tenon structures 112 are staggered, and the clamping joints 123 can be inserted in gaps between the tenon structures 112 when the clamping joints 123 and the tenon structures 112 are coupled. Fixing grooves 124 corresponding to the fixing structures 113 are defined on the second clamping structure 121. The fixing grooves 124 are matched with the fixing structures 113. An end of the connecting structure 122 is fixedly connected to the second clamping structure 121.

In an embodiment, a first connecting hole 114 is defined on the first clamping structure 111. A second connecting hole 125 is defined on the second clamping structure 121. The first connecting hole 114 is detachable and communicates with the second connecting hole 125. A connecting member 117 is positioned in the first connecting hole 114 and the second connecting hole 125. The first clamping structure 111 is fixed to the second clamping structure 121 through the connecting member 117.

Furthermore, when the second clamping structure 121 is connected to the first clamping structure 111, the clamping joints 123 are coupled to the tenon structures 112, and the fixing structures 113 are positioned in the fixing grooves 124. The first connecting hole 114 can communicate with the second connecting hole 125. When the connecting member 117 is inserted in the first connecting hole 114 and the second connecting hole 125, the first clamping structure 111 is fixed to the second clamping structure 121. In an embodiment, the first connecting hole 114 is defined at a side of the fixing structure 113. The second connecting hole 125 is defined at a side of the clamping joint 123. An axis of the second connecting hole 125 is coaxial with an axis of the first connecting hole 114, and such axis is perpendicular to the rotating axis 14. Therefore, the first clamping structure 111 and the second clamping structure 121 may be fixedly connected in a direction perpendicular to the rotating axis 14 through the connecting member 117. The connecting member 117 may be a screw or a pin. The second connecting hole 125 may be a screw hole or a cylindrical hole.

The connecting structure 122 is fixedly connected to the second clamping structure 121. When a rotation force is applied to the connecting structure 122, the connecting portion 122 can transmit the rotational torque to the clamping joint 123. Due to the fixed connection between the second clamping structure 121 and the first clamping structure 111, the clamping joints 123 transmit the rotational torque to the tenon structures 112 and the fixing structures 113, and the displaying assembly 11 can be freely rotated to horizontal or vertical orientations.

In an embodiment, the displaying panel may be one of central control screen, displaying screen, and navigator. The first clamping structure 111 is positioned at a back plate of the central control screen. The tenon structures 112 and the fixing structures 113 of the first clamping structure 111 are spaced apart and positioned at a center of the central control screen.

The transmitting assembly 12 may be one of a rotating body such as a cylinder, a disk, and a connecting shaft. A central axis of the transmitting assembly 12 is coaxial with the rotating axis 14.

In an embodiment, a receiving hole 115 is defined on the first clamping structure 115, and receiving hole 115 is located between the tenon structures 112. The displaying assembly 11 further comprises a first signal interface 116. The first signal interface 116 is positioned in the receiving hole 115. The first signal interface 116 is configured to provide signals to the central control screen.

In an embodiment, the tenon structures 112 includes a first tenon 1121, a second tenon 1122, and a third tenon 1123, which are arranged around the receiving hole 15. The first tenon 1121 includes a symmetrical bending part 1124. The second tenon 1122 and the third tenon 1123 are arranged symmetrically around the receiving hole 115.

Furthermore, the first signal interface 116 is coaxial with the rotating axis 14, so that the first signal interface 116 rotates coaxially with the rotating axis 14. When the first clamping structure 111 and the second clamping structure 121 are connected, the clamping joints 123 are inserted in gaps between the first tenon 1121, the second tenon 1122, and the third tenon 1123, thus connecting strength between the first clamping structure 111 and the second clamping structure 121 can be improved. The first tenon 1121, the second tenon 1122, and the third tenon 1123 balance the distribution of the rotating torque, thereby enabling smooth rotation of the first signal interface 116.

In an embodiment, the receiving hole 115 is arranged at the center position of the back plate of the central control screen. The receiving hole 115 may be a blind hole, and the signal interface 116 is installed in the receiving hole 115. An axis of the receiving hole 115 is coaxial with the rotating axis 14. The receiving hole 115 is arranged between the tenon structures 112, and the tenon structures 112 function to fix the position and angle of the first signal interface 116, so that connection of the first signal interface 116 is not affected by the rotation of the display assembly 11, so that the first signal interface 116 can continuously and stably provide signals.

In an embodiment, a through hole 126 corresponding to the receiving hole 115 is defined on the second clamping structure 121. The through hole 126 is detachable and communicates with the receiving hole 115.

In an embodiment, the second clamping structure includes side walls 127, the through hole 126 is formed between the side walls 127. The side walls 127 abut against sides of the tenon structures 112 when the through hole 126 is communicating with the receiving hole 115.

In an embodiment, the transmitting assembly 12 further includes a second signal interface 128. The second signal interface 128 is positioned in the through hole 126, and the second signal interface 128 is electrically connected to the first signal interface 116.

The transmitting assembly 12 provides signals to the display assembly 11. The through hole 126 communicates with the receiving hole 115 to provide a cavity which accommodates the first signal interface 116 connected to the second signal interface 128. The side walls 127 abuts against sides of the tenon structures 112 when the through hole 126 is communicating with the receiving hole 115, so that the first signal interface 116 and the second signal interface 128 can be stably and firmly connected.

Shape of the through hole 126 fits with shape of the receiving hole 115. The side walls 127 are ribs extended along the direction of the rotating axis 14, and the side walls 127 are integrally connected with the clamping joints 123. When the first clamping structure 111 and the second clamping structure 121 are connected, the through hole 126 communicate with the accommodating hole 115, the first signal interface 116 is electrically connected to the second signal interface 128, and the side walls 127 abuts against sides of the tenon structures 112.

Figure 3:
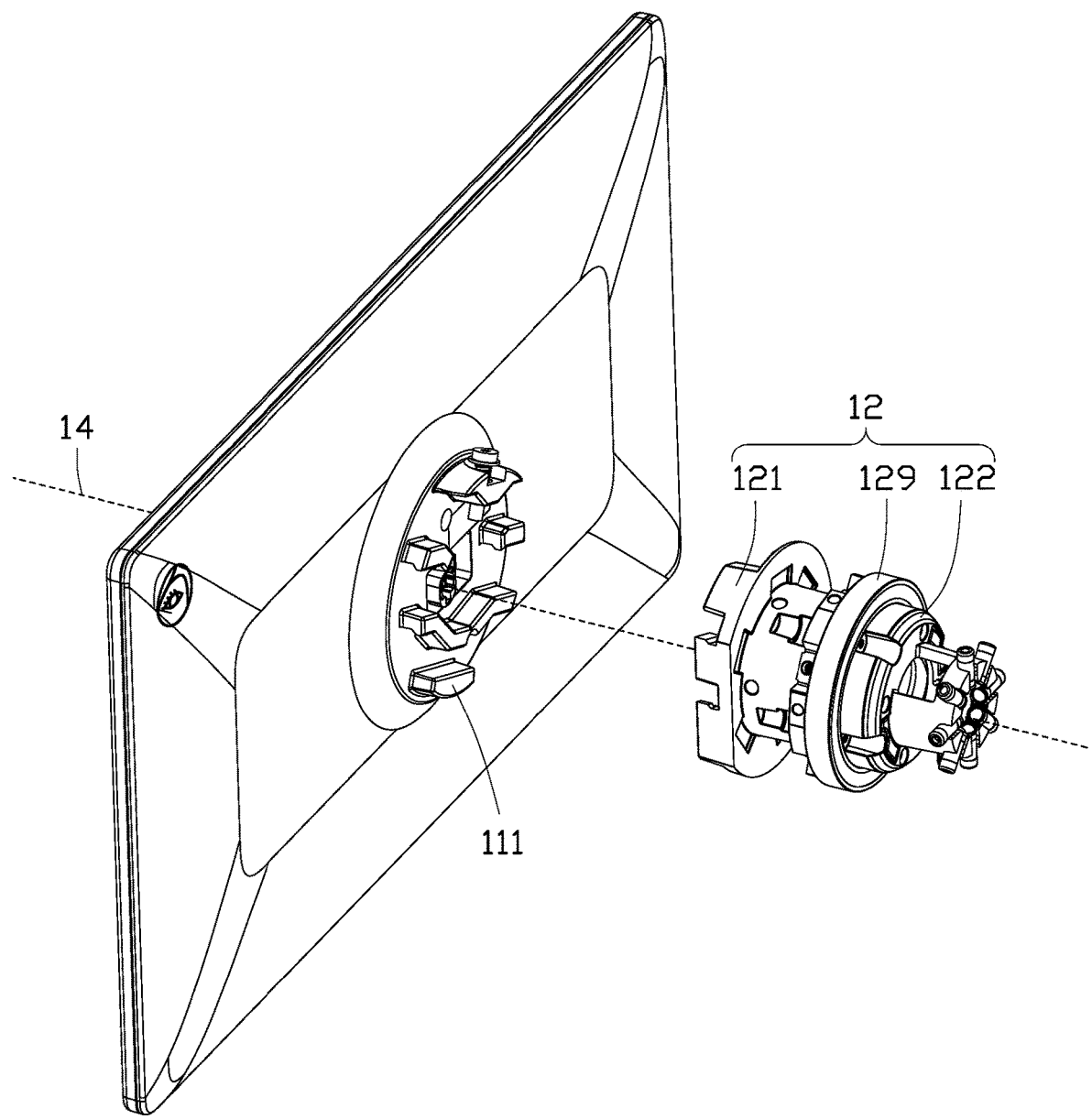
FIG. 3 is an exploded view of the displaying device in an embodiment of the present application.

Referring to FIG. 3, the transmitting assembly 12 further includes a bearing 129. The bearing 129 is positioned at an end of the connecting structure 122 away from the second clamping structure 121, and the bearing 129 is rotatably connected with the connecting structure 122.

Furthermore, an inner surface of the bearing 129 is fixedly connected with an outer surface of the connecting structure 122, so that the connecting structure 122 can be rotated relative to an outer surface of the bearing 129. The connecting structure 122 drives the second clamping structure 121 to rotate coaxially, and the second clamping structure 121 is fixedly connected with the first clamping structure 111, thereby allowing coaxial rotation of the first clamping structure 111 and the bearing 129.

In an embodiment, the outer surface of the connecting structure 122 may be provided with a snap-fit structure such as a groove or a step, for placing and holding the bearing 129. An axis of the bearing 129 is coaxial with the rotating axis 14. The second clamping structure 121 is coupled with the first clamping structure 111, so that the first clamping structure 111, the second clamping structure 121, and the bearing 129 can rotate coaxially, so that the transmitting assembly 12 can drive the display assembly 11 to rotate smoothly, and the displaying device 1 can be switched between landscape and portrait screens smoothly.

Figure 4:
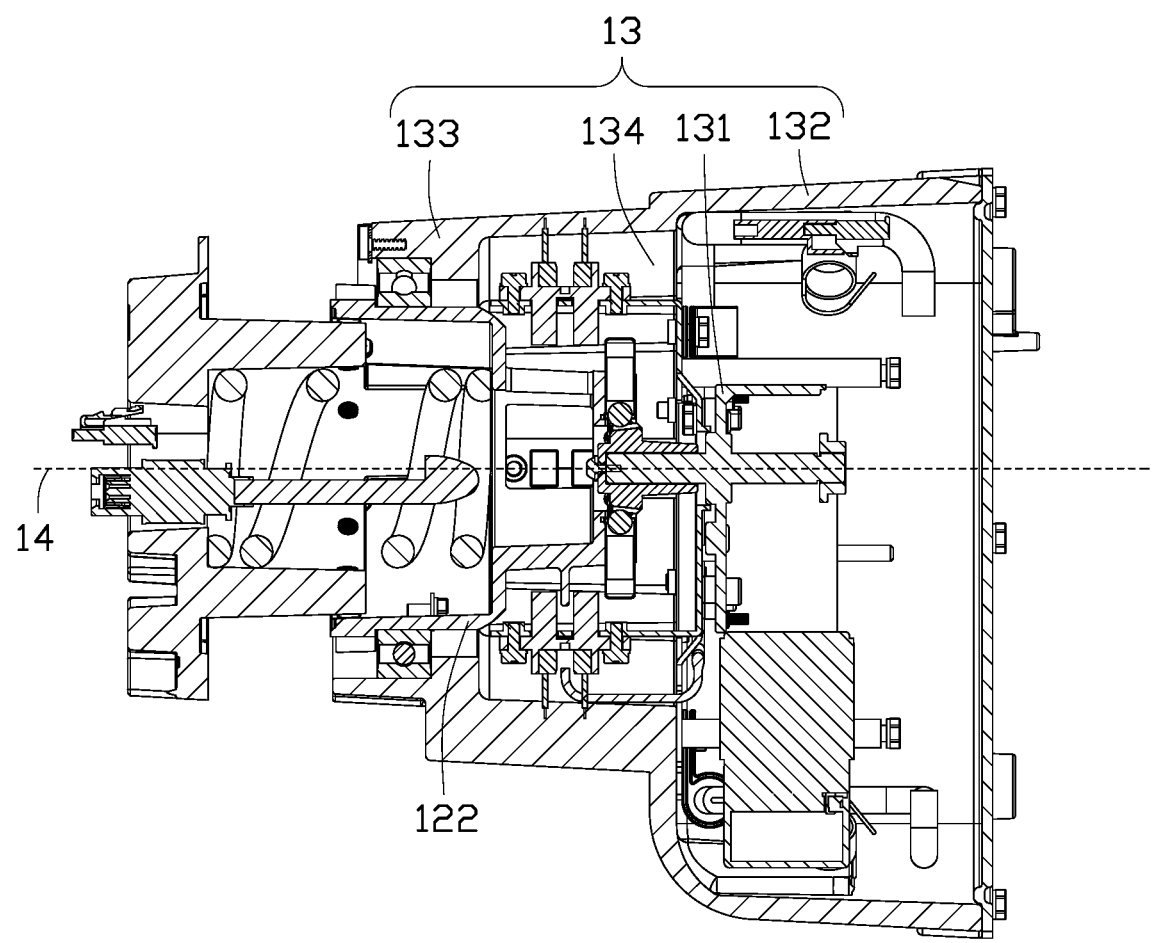
FIG. 4 is a cross section view of the transmission assembly of the displaying device in an embodiment of the present application.

Referring to FIG. 4, the displaying device 1 further includes a driving assembly 13. The driving assembly 13 includes a driving member 131, an output shaft of the driving member 131 is connected to the connecting structure 122.

In an embodiment, the driving assembly 13 further includes a housing 132, a cavity 134 with an opening 133 is defined in the housing 132. The connecting structure 122 is partially positioned in the cavity 134, and the connecting structure 122 is extended out of the cavity 134 from the opening 133. The connecting structure 122 is rotatably connected with the housing 132.

The output shaft of the driving member 131 is coaxial with the rotating axis 14. The output shaft of the driving member 131 drives the connecting structure 122 to rotate, and the connecting structure 122 and the output shaft of the driving member 131 rotate coaxially. A central axis of the opening 133 is coaxial with the output shaft of the driving member 131, and an inner surface of the opening 133 constrains rotation of the extension 122 around the rotating axis 14, thereby enabling the output shaft of the driving member 131 to drive the connecting structure 122 to rotate around the rotation axis 14 stably. The connecting structure 122 drives the second clamping structure 121 to rotate coaxially, the second clamping structure 121 is fixedly connected with the first clamping structure 111, the first clamping structure 111 can be rotated accordingly, thereby the driving assembly 13 can drive the display assembly 11 to rotate smoothly through the transmitting assembly 12.

In this embodiment, the driving member 131 may be a power element such as a motor or an electric motor, and the driving member 131 can provide rotational torque. The opening 133 may be a circular opening, and a sidewall of the circular opening 133 extends toward the second clamping structure 121. The central axis of the opening 133 is coaxial with the output shaft of the driving member 131.

Referring to FIG. 1 and FIG. 4, a rotating assembly is further disclosed in the present application. The rotating assembly includes the first clamping structure 111, the transmitting assembly 12, and the driving assembly 13. The first clamping structure 111 is configure to connect the displaying panel and the transmitting assembly 12. Detailed structures of the first clamping structure 111, the transmitting assembly 12, and the driving assembly 13 are as described above, and are not repeated.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A displaying device comprising:
a displaying assembly comprising a displaying panel and a first clamping structure connected to the displaying panel, wherein the first clamping structure comprises tenon structures and fixing structures, the tenon structures are positioned between the fixing structures;
a transmitting assembly comprising a second clamping structure and a connecting structure, wherein the second clamping structure is coupled to the first clamping structure, the clamping structure comprises clamping joints, the clamping joints are coupled to the tenon structures, fixing grooves are defined on the second clamping structure, profile of the fixing grooves are matched with the fixing structures, an end of the connecting structure is fixedly connected to the second clamping structure;
the tenon structures comprises a first tenon, a second tenon, and a third tenon, wherein the first tenon comprises two bending parts, and the two bending parts are symmetrically connected, the second tenon and the third tenon are symmetrically arranged with respective to a center of first tenon, and the second tenon is spaced with one of the two bending part, the third tenon is spaced with another one of the two bending part; one of the fixing structures arranged at a side of the first tenon away from the second tenon and the third tenon, and is spaces with the first tenon; another one of the fixing structures arranged at a side of the second tenon and the third tenon away from the first tenon, and is spaced with the second tenon and the third tenon; the clamping joints and the tenon structures are staggered, and the clamping joints is insertable into respective gaps between the first tenon, the second tenon, the third tenon, and the fixing structures.

2. The displaying device of claim 1, wherein a first connecting hole is defined on the first clamping structure, a second connecting hole is defined on the second clamping structure, the first connecting hole is detachable and communicates with the second connecting hole, a connecting member is positioned in the first connecting hole and the second connecting hole, the first clamping structure is fixed to the second clamping structure through the connecting member.

3. The displaying device of claim 1, wherein a receiving hole is arranged at a back plate of the displaying panel, and the receiving hole is defined on the first clamping structure, the displaying assembly comprises a first signal interface, the first signal interface is positioned in the receiving hole.

4. The displaying device of claim 3, wherein the tenon structures are positioned surrounding the receiving hole, the two bending parts are arranged at a side of the receiving hole, the second tenon and the third tenon are symmetrically arranged with respective to a center of the receiving hole.

5. The displaying device of claim 3, wherein a through hole is defined on the second clamping structure, the through hole is detachable and communicates with the receiving hole.

6. The displaying device of claim 5, wherein the second clamping structure comprises side walls, the through hole is formed between the side walls, the side walls abuts against the first tenon, the second tenon, and the third tenon when the through hole is communicated with the receiving hole.

7. The displaying device of claim 6, wherein the transmitting assembly comprises a second signal interface, the second signal interface is positioned in the through hole, and the second signal interface is connected to the first signal interface.

8. The displaying device of claim 1, wherein the transmitting assembly comprises a bearing, the bearing is positioned at an end of the connecting structure away from the second clamping structure, the bearing is rotatably connected with the connecting structure.

9. The displaying device of claim 1, wherein the displaying device comprises a driving assembly, the driving assembly comprises a driving member, an output shaft of the driving member is connected to the connecting structure.

10. The displaying device of claim 9, wherein the driving assembly comprises a housing, a cavity with an opening defined in the housing, the connecting structure is partially positioned in the cavity, and the connecting structure extends out of the cavity from the opening, the connecting structure is rotatably connected with the housing.

11. A rotating assembly comprising:
a first clamping structure configured for connecting a displaying panel, wherein the first clamping structure comprises tenon structures and fixing structures, the tenon structures are positioned between the fixing structures; the tenon structures comprises a first tenon, a second tenon, and a third tenon, the first tenon comprises two bending parts, and the two bending parts are symmetrically connected, the second tenon and the third tenon are symmetrically arranged with respective to a center of first tenon, and the second tenon is spaced with one of the two bending part, the third tenon is spaced with another one of the two bending part; one of the fixing structures arranged at a side of the first tenon away from the second tenon and the third tenon, and is spaces with the first tenon; another one of the fixing structures arranged at a side of the second tenon and the third tenon away from the first tenon, and is spaced with the second tenon and the third tenon; the clamping joints and the tenon structures are staggered, and the clamping joints is insertable into respective gaps between the first tenon, the second tenon, the third tenon, and the fixing structures;

a transmitting assembly comprising a second clamping structure and a connecting structure, wherein the second clamping structure is coupled to the first clamping structure, the clamping structure comprises a clamping joint, the clamping joint is coupled to the tenon structure, fixing grooves are defined on the second clamping structure, profile of the fixing grooves are matched with the fixing structures, an end of the connecting structure is fixedly connected to the second clamping structure; and a driving assembly comprising a driving member, an output shaft of the driving member is connected to the connecting structure.

12. The rotating assembly of claim 11, wherein a first connecting hole is defined on the first clamping structure, a second connecting hole is defined on the second clamping structure, the first connecting hole is detachable and communicates with the second connecting hole, a connecting member is positioned in the first connecting hole and the second connecting hole, the first clamping structure is fixed to the second clamping structure through the connecting member.

13. The rotating assembly of claim 11, wherein a receiving hole is arranged at a back plate of the displaying panel, and the receiving hole is defined on the first clamping structure, the displaying assembly comprises a first signal interface, the first signal interface is positioned in the receiving hole.

14. The rotating assembly of claim 13, wherein the tenon structures are positioned surrounding the receiving hole, the two bending parts are arranged at a side of the receiving hole, the second tenon and the third tenon are symmetrically arranged with respect to a center of the receiving hole.

15. The rotating assembly of claim 13, wherein a through hole is defined on the second clamping structure, the through hole is detachable and communicates with the receiving hole.

16. The rotating assembly of claim 15, wherein the second clamping structure comprises side walls, the through hole is formed between the side walls, the side walls abuts against the first tenon, the second tenon, and the third tenon when the through hole is communicated with the receiving hole.

17. The rotating assembly of claim 16, wherein the transmitting assembly comprises a second signal interface, the second signal interface is positioned in the through hole, and the second signal interface is connected to the first signal interface.

18. The rotating assembly of claim 11, wherein the transmitting assembly comprises a bearing, the bearing is positioned at an end of the connecting structure away from the second clamping structure, the bearing is rotatably connected with the connecting structure.

19. The rotating assembly of claim 11, wherein the driving assembly comprises a housing, a cavity with an opening is defined in the housing, the connecting structure is partially positioned in the cavity, and the connecting structure is extended out of the cavity from the opening, the connecting structure is rotatably connected with the housing.

\* \* \* \* \*